United States Patent [19]

Matsunaga

[11] Patent Number: 5,117,292
[45] Date of Patent: May 26, 1992

[54] SOLID-STATE CAMERA HAVING CHANGEABLE SENSITIVITY

[75] Inventor: Yoshiyuki Matsunaga, Kamakura, Japan

[73] Assignee: Kabushiki Kaisha Toshiba, Kawasaki, Japan

[21] Appl. No.: 514,042

[22] Filed: Apr. 27, 1990

[30] Foreign Application Priority Data

Sep. 13, 1989 [JP] Japan ................... 1-235751

[51] Int. Cl.⁵ ................ H04N 3/14; H04N 5/335; H04N 5/238
[52] U.S. Cl. ................ 358/213.19; 358/228
[58] Field of Search ............... 358/213.11, 213.19, 358/228, 213.31, 213.22, 213.27

[56] References Cited

U.S. PATENT DOCUMENTS

| | | | |
|---|---|---|---|
| 4,489,423 | 12/1984 | Suzuki | 377/58 |
| 4,623,927 | 11/1986 | Hoshino | 358/213.19 |
| 4,652,916 | 3/1987 | Suzaki et al. | 358/213.19 |
| 4,689,689 | 8/1987 | Saito et al. | 358/228 |
| 4,734,777 | 3/1988 | Okino et al. | 358/213.19 |
| 4,825,293 | 4/1989 | Kobayashi et al. | 358/213.19 |
| 4,843,474 | 6/1989 | Suzuki | 358/213.19 |
| 4,879,600 | 11/1989 | Ise et al. | 358/213.19 |

FOREIGN PATENT DOCUMENTS 6351775 3/1988 Japan.

OTHER PUBLICATIONS

T. Yamada, et al., "Image Sensors and Processing Circuits—A Line-Address CCD Image Sensor", IEEE International Solid-State Circuits Conference, Feb., 1987, pp. 106–107.

Primary Examiner—James J. Groody
Assistant Examiner—Glenton B. Burgess
Attorney, Agent, or Firm—Foley & Lardner

[57] ABSTRACT

Disclosed is a solid-state camera comprising a solid-state image sensor element composed of a plurality of planarly arranged units of picture element cells, drive means for supplying a pulse power source thereto, signal process means for obtaining a picture image signal by processing an output signal from each of the unit of picture element cells, detection means for generating a detection signal based on an output voltage value corresponding to the picture image signal, and sensitivity adjustment means for generating a sensitivity adjustment signal to adjust sensitivity required based on the detection signal in each the unit of picture element cells. This camera controls output signals for read transistors correponding to the respective picture element cells and the respective picture element cells in a unit row at the same time, and adjusts an output voltage value from each unit of picture element cells based on an output voltage value of each unit of picture element cells in a previous line, frame or field by stop signal registers for stopping output signals of the picture element cells.

6 Claims, 5 Drawing Sheets

TRANSFER DIRECTION

SOLID-STATE CAMERA HAVING CHANGEABLE SENSITIVITY

BACKGROUND OF THE INVENTION

1. Field of the Invention

The present invention relates to a solid-state camera, and more particularly relates to a solid-state camera which can provide fine picture images even under a backlight state.

2. Description of the Prior Art

FIG. 1 is a schematic diagram of a prior art solid-state camera or a video camera. Incident light is focused by a lens 1 on an image sensor face of a solid-state image sensor or a solid-state area sensor 2 to form an image. The solid-state area sensor 2 is composed of a plurality of semiconductor photoelectric conversion elements (picture element cells) which are planarly arranged on the plane image picture face. The solid-state area sensor 2 is driven by a pulse power source and direct current outputted from a driven means 3 and photoelectric conversion signals of a photoimage focused on the image sensor face are successively output to a signal processor means 4. And then electric signals as the photoelectric conversion signals from the solid-state area sensor 2 are processed and output as video signals by the processor means 4.

When such a conventional general video camera is used under a backlight, it is usually difficult to effectively take fine picture images. For example, when the video camera is used for taking scenes outside the window immediately after photographing the inside of a room, very strong light rays from the outside come into the image faceplate of the solid-state area sensor 2. In this case, since the output of a portion corresponding to the light rays in the picture element cells composing the solid-state area sensor 2 is saturated, a picture image corresponding to the portion becomes white. Thus, it is difficult to clearly take scenes out of the window in such a case. To cope with the problem, an ordinary camera has an auto-iris mechanism for automatically adjusting or closing an iris of the lens to control the incident light. Accordingly, the camera having such an auto-iris mechanism can guarantee the photographing of scenes outside of the window. However, in contrast, the picture images in the room become dark and undistinguishable, respectively. Namely, it is difficult to clearly take picture images of both the outside and the inside of a room at the same time by such a camera.

SUMMARY OF THE INVENTION

Therefore, it is an object to provide a solid-state camera which can guarantee excellent picture images even under backlight.

To achieve the above mentioned object, a solid-state camera, which is a preferred embodiment of the present invention, comprises a solid-state image sensor element composed of a plurality of picture element cells planarly arranged for outputting an electric signal obtained by photoelectric conversion of an incident light, drive means for driving the solid-state image sensor element, and signal process means for obtaining a picture image signal by processing an output signal from the solid-state image sensor element. Moreover, the signal process means has means for detecting a position of an incident light introduced onto the solid-state image sensor element in an amount larger than a predetermined amound and generating a detection signal, and the drive means has a sensitivity adjustment means for generating a sensitivity adjustment signal so as to control sensitivity of a unit of picture element cells in each specific portion in the solid-state image sensor element based on the detection signal.

In the above described solid-state camera of the embodiment, when strong incident light is received in a portion of the planar solid-state image sensor element, an output signal to be outputted from a picture element cell in the portion is saturated. Then, the signal process means generates the detection signal for specifying a position of the picture element cell. While the drive means generates a sensitivity adjustment signal for adjusting the output of the picture element cell based on the detection signal corresponding to the position so as to control an output signal value from each specific unit of picture element cells. Namely, when an incident light is introduced onto a portion or the entire area of the solid-state image sensor element in an amount larger than a predetermined amount as in a case of photographing under a condition of backlight, the sensitivity of the portion is automatically controlled. Thus, the solid-state camera can photograph a portion in a strong light, such as scenes outside the window, and another portion in a weak light, such as an inteior of a room, at the same time or successively.

These and other objects, features and advantages of the present invention will be more apparent from the following description of a preferred embodiment, taken in conjunction with the accompanying drawings.

DETAILED DESCRIPTION OF THE EMBODIMENT

Hereinafter, an embodiment of the present invention will be described with reference to the drawings.

Figure 1:
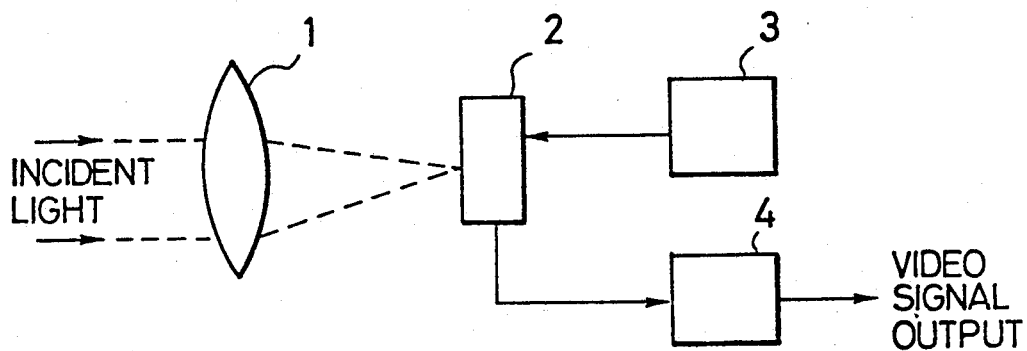
FIG. 1 is a block diagram showing schematically a conventional solid-state camera.
Figure 2:
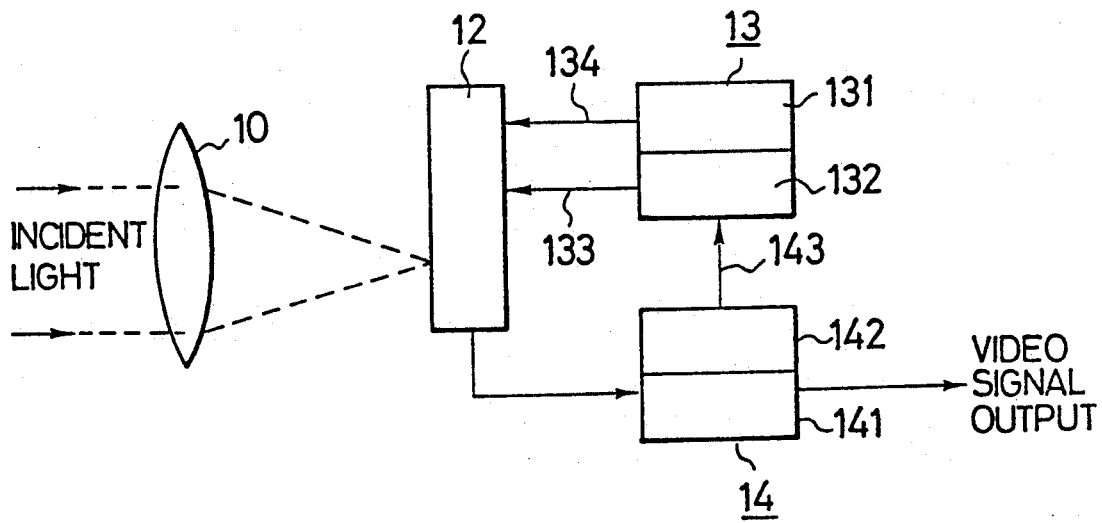
FIG. 2 is a block diagram showing schematically an embodiment of the present invention.

FIG. 2 is a block diagram showing the composition of a solid-state camera, which is an embodiment of the present invention. Reference numeral 10 designates a lens for focusing an incident light to form an image on an image sensor face of a solid-state camera, that is, a solid-state image sensor element 12 (hereinafter called an area sensor). The area sensor 12 performs photoelectric conversion of the incident light introduced in the solid-state camera through the lens 10, then outputs a corresponding electric signal. Namely, the sensor 12 is a so-called semiconductor image sensor element. Particularly, the solid-state area sensor 12 of the embodiment is composed of units of picture element cells respectively having independent sensitivity adjustment mechanism as mentioned below.

While, reference numeral 13 denotes drive means for basically supplying a direct current (DC) power source and a pulse power source to the solid-state area sensor 12.

Moreover, reference numeral 134 shows a control signal for driving the solid-state area sensor 12.

The drive means 13 includes a drive portion 131 and a sensitivity suppression pulse generation portion 132 for generating a sensitivity suppression pulse 133 to be outputted to the solid-state area sensor 12.

Reference numeral 14 designates signal process means for receiving the photoelectric conversion signal from the solid-state area sensor 12, then processing the signal so as to obtain a video signal. The signal process means includes a signal process portion 141 and a position detection portion 142 for detecting a position on the solid-state area sensor 12, where a strong incident light is received. The positional information of each the picture element cell is detected by judging whether each output of the picture element cell is saturated.

The solid-state camera of the embodiment is described above. For example, when a strong incident light is received in a portion of the image sensor face of the solid-state area sensor 12 and the picture element output in the portion is saturated, a position of each the picture element cell in the portion is detected by the position detection portion 142 of the signal process means 14, then a position signal 143 is inputted into the sensitivity suppression pulse generating portion 132 of the drive means 13. In the sensitivity suppression pulse generating portion 132, the position signal 143 is decoded to generate a pulse 133 for suppressing the sensitivity of each the picture element cell where the strong incident light is received so as to adjust it suitably. Accordingly, even when a strong incident light is introduced onto a portion of the solid-state area sensor 12 in a case under a condition of backlight, since the sensitivity of each the picture element cell in the portion is automatically suppressed, white blooming of a picture image corresponding to backlit portion can be prevented. Thus, the image can be formed clearly. Therefore, even in case of photographing scenes outside of the window and those in the room at the same time or successively, it becomes possible to form clear picture images of these. Incidentally, it is preferred that the portion in the solid-state area sensor 12, whose sensitivity is to be suppressed, includes not only picture element cells where a strong incident light is directly received but also picture element cells in the vicinity of them. It is possible to carry out the process for suppressing the sensitivity by guessing from a signal of the one field or one frame, or to carry out it by guessing from a photoelectric conversion signal outputted from a unit of picture element cells before one line.

Moreover, it is necessary for each unit of picture element cells in the solid-state area sensor 12 to have a sensitivity adjustment function independently. An example of such an area sensor will be described next.

Figure 3:
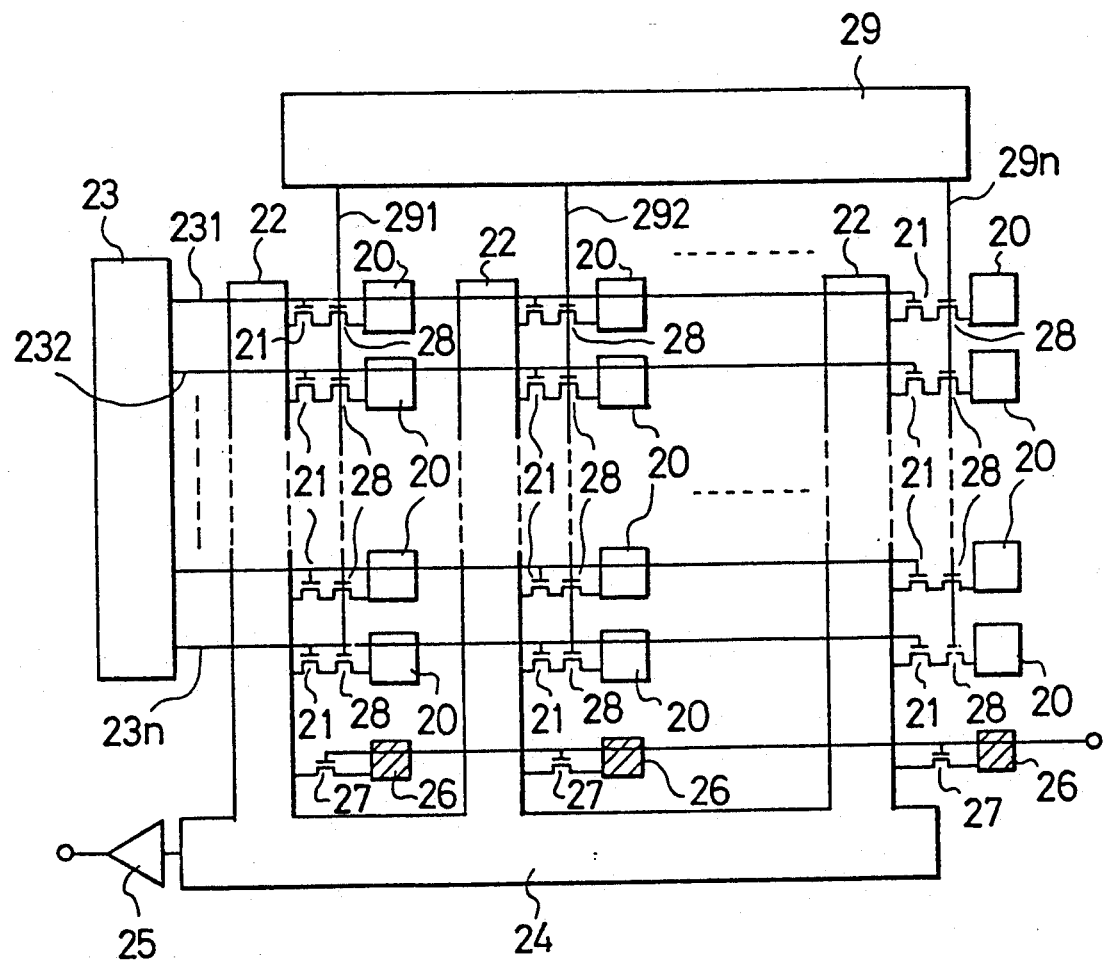
FIG. 3 is a diagram of a line address type CCD sensor used in the solid-state camera of the embodiment shown in FIG. 2.

FIG. 3 is a compositional diagram of a solid-state area sensor to be used in the solid-state camera of the embodiment. This sensor comprises a plurality of planarly arranged signal storage diodes 20, read transistors 21, vertical CCD 22 for respectively reading electric charges stored in the diodes 20 through the read transistors 21, a vertical shift register 23 for driving the read transistors 21, a horizontal CCD 24 for successively transferring signals outputted from the vertical CCD 22 to output means 25, drains 26 and exhaustion gates 27 for exhausting signal charges supplied to respective potential wells (to be described hereinafter) in the vertical CCD 22.

In the solid-state camera of the embodiment having the above composition, the vertical CCDs 22 respectively have signal potential wells for transferring signal charges and empty potential wells for transferring unnecessary charges, for example such as smear charges. These wells transfer signal charges stored in the diodes 20 to the horizontal CCD 24 successively. Namely, to transfer the signal charges from the signal storage diodes 20 to the signal potential wells in the respective vertical CCD, the vertical shift register 23 is suitably driven to apply voltage of the H (high) level to respective address lines 231, 232, . . . , 23n so as to make the transistors 21 "on". Thereby, the signal charges stored in the diodes 20 are read by the vertical CCD, and then transferred to the horizontal CCD 24 successively.

In the solid-state area sensor 22, it is necessary to change the sensitivity of each the planarly arranged unit of picture element cells corresponding to an amount of the incident light. As shown in the same diagram, stop gates 28 therefore are provided in parallel with the signal storage diodes 20 and the respective transistors 21, so as to partially stop exhaustion of the charges by setting the gates 28 "off" corresponding to picture element cells whose sensitivity should not be suppressed. The stop gates 28 are respectively driven by a stop signal register 29 through stop gate lines 291, 292, . . . , 29n. Namely, with respect to the picture element cells on one line determined by the shift register 23, whose sensitivity should not be suppressed, a signal voltage is respectively applied to the corresponding gates 28 to make them off through the lines 291, 292, . . . , 29n of the stop signal register 29 so as to partially stop exhaustion of the charges. Incidentally, information (a value of the level) to be given onto the lines 291, 292, . . . , 29n is always renewed. Accordingly, in the CCD sensor as shown in FIG. 3, picture element cells whose sensitivity should be suppressed can be selectively and independently designated in the planar arrangement. Of course, the area whose sensitivity should be suppressed comprises picture element cells whose output is saturated by a strong incident light as described above and other cells existing around them.

Figure 4:
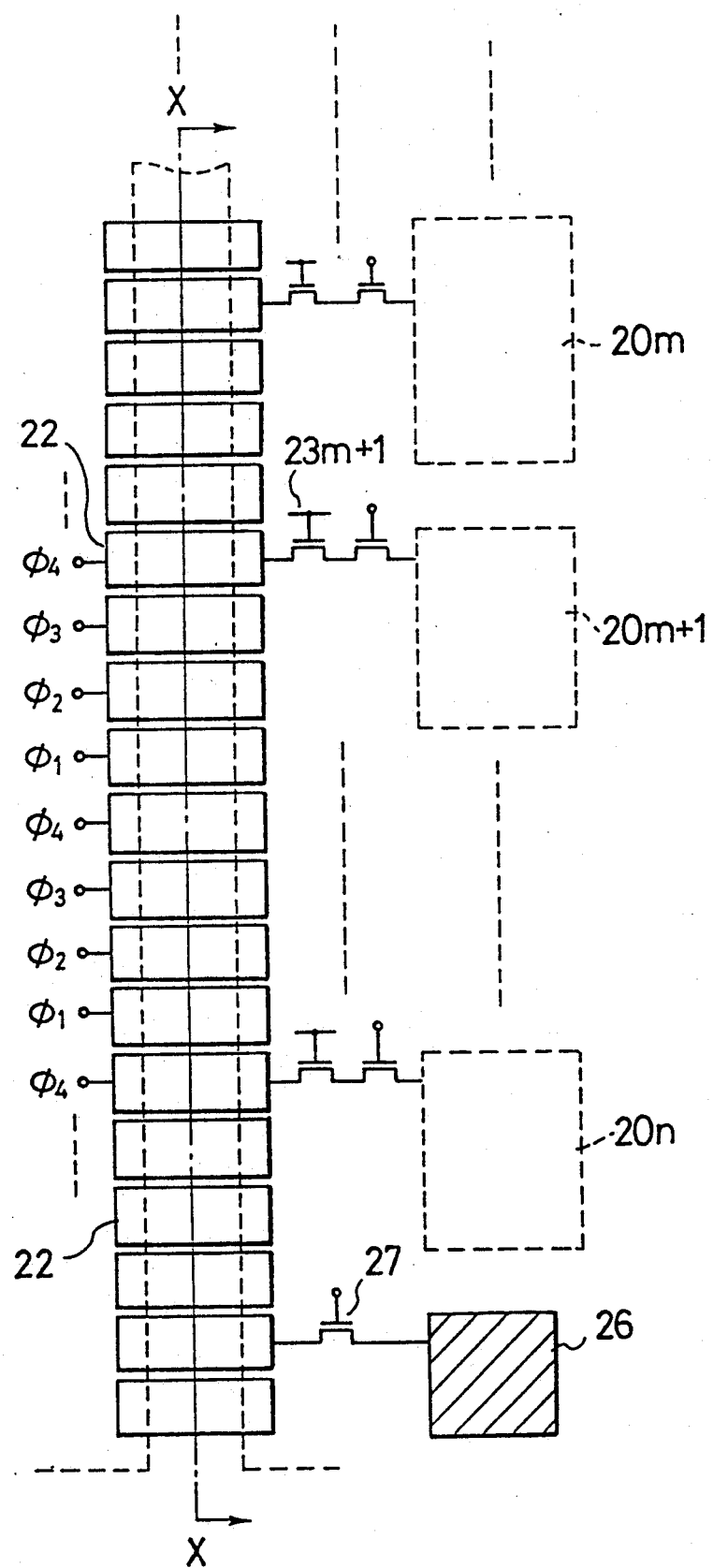
FIG. 4 is a plan view of a line address type CCD sensor for one line in the compositional diagram of the line address type CCD sensor shown in FIG. 3.
Figure 5A:
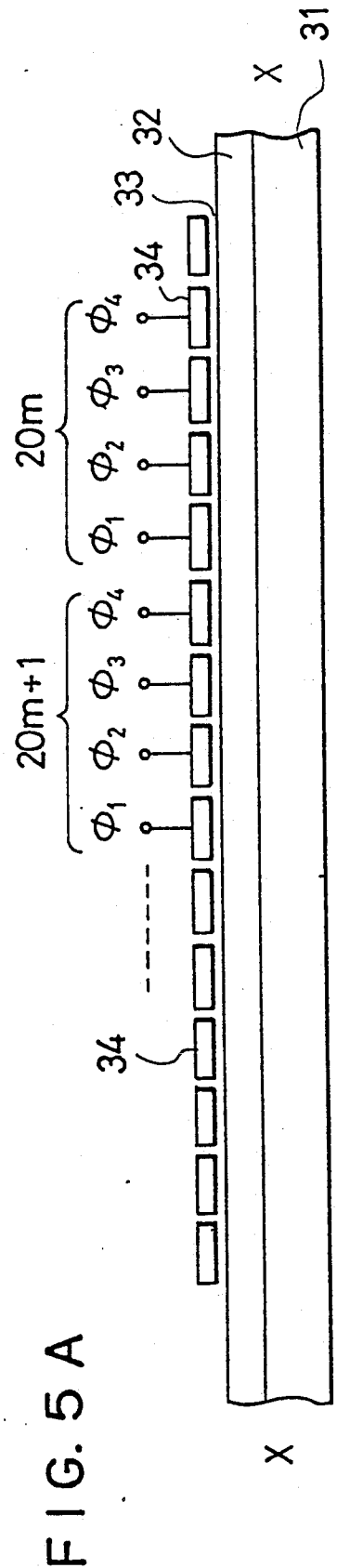
FIG. 5A is a cross section taken along line X—X in the line address type CCD sensor for one line shown in FIG. 4, and FIGS. 5B to 5D are potential diagrams to, respectively, show operational states thereof.

FIG. 4 is a plan view of the vertical CCD for one line in the solid-state area sensor shown in FIG. 3. FIG. 5A is a cross section taken along line X—X of the vertical CCD for one line in FIG. 4, and FIGS. 5B to 5D show potential diagrams in respective timings of the vertical CCD for one line shown in FIG. 5A. In FIG. 5A, an n-type buried channel 32 of CCD is formed in the surface of a p-type silicon substrate 31 by ion implantation, and a plurality of transfer electrodes 34 to be driven by 4-phase clock pulses $\phi 1$ to $\phi 4$ are arranged adjacent to one another over the channel 32 through an insulating film 33.

Next, basical operation for reading the picture element cells planarly arranged will be explained.

The stop gate lines 291, 292, . . . , 29n of the stop register 29 in FIG. 3 are set at the H level to turn on these stop gates lines 291, 292, ..., 29n. Then, a read pulse is given to an address line, for example, the line 231, so that signal charges stored in the corresponding photodiodes 20 on the address line 231 are respectively read into the vertical CCD 22. Thereafter, the stop gate lines 291, 292, ..., 29n are set at the L level to turn off the gate lines 291, 292, ..., 29n. As the result, the signal charges for one line read in the vertical CCD 22 are respectively transferred into the horizontal CCD 24 by the clock pulses $\phi1$ to $\phi4$, then outputted to the signal process means 14 through the output portion 25.

Subsequently, the stop gate lines 291, 292, ..., 29n are set at the on state, and a read pulse is applied to the address line 232, so that signal charges stored in the corresponding photodiodes 20 on the address line 232 are respectively read into the vertical CCD 22. Then, the signal charges for one line read in the vertical CCD 22 are respectively transferred to the signal process means 14 through the horizontal CCD 24 and the output portion 25 in the same manner as described above.

The same process is given to all the address lines to complete the read operation for one field. As the result, the interline transfer operation is finished.

Figure 5B:
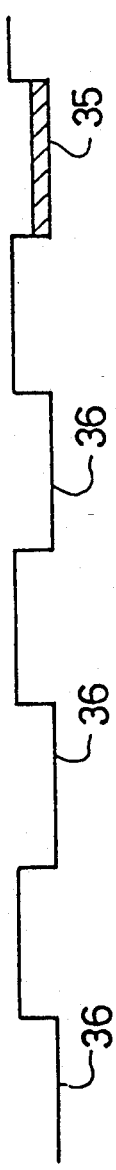

FIG. 5B shows a state in which a signal charge from one of the diodes, for example a diode $20m$, is read in the corresponding vertical CCD 22 (as shown in FIG. 4). In this case, a potential well where the signal charge is stored is called a signal potential well 35, and other wells where signal charges are not stored are called smear potential wells 36.

Figure 5C:
Figure 5D:

In such a situation, for example, when a strong light is introduced onto a diode $20m+1$, and it is detected by an output signal value for the previous frame or field from the solid-state area sensor 12 that the picture element output is saturated, an electron shutter operation is given to the diode $20m+1$. As shown in FIG. 5C, when the smear potential well 36 in which a signal charge is not stored reaches a position corresponding to the diode $20m+1$, a stop gate line for the diode $20m+1$ is selectively turned on to apply voltage to an address line $23m+1$ so as to exhaust a charge stored into the corresponding vertical CCD. This operation is carried out at a suitable time before a signal read pulse for the real purpose is given to the address line $23m+1$ during the read operation of the solid-state area sensor 22.

Next, when the signal read pulse is applied to the address line $23m+1$ in accordance with a read timing for the real purpose as shown in FIG. 5D, a charge stored again in the diode $20m+1$ is transferred as a signal charge to the signal potential well 35. While, the unnecessary charge exhausted to the smear potential well 36 as mentioned above is exhausted through the gate 27 set at the on state by operation of a drive line $29m+1$ when the smear potential well reaches a position corresponding to the drain 26.

As the result, the sensitivity of the photodiode $20m$ is kept at an ordinary level, while that of the photodiode $20m+1$ is suppressed by the so-called electron shutter operation.

Figure 6:
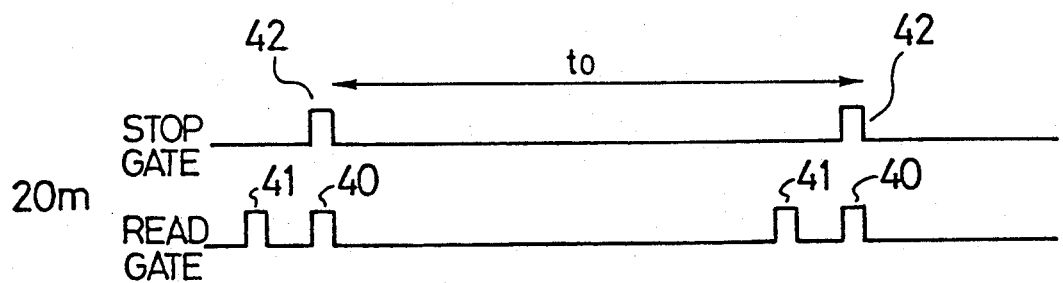
FIG. 6 is a diagram to explain the operation for stopping read in the line address type CCD sensor for one line shown in FIG. 4.
Figure 6:
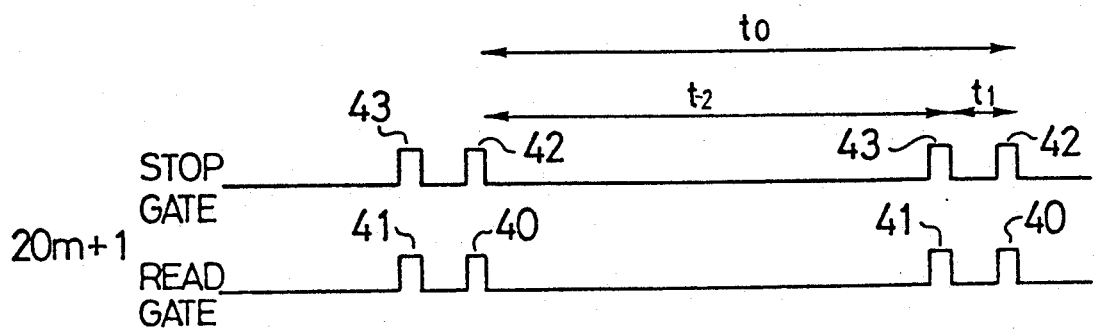

FIG. 6 shows examples of pulses to be applied to each the read gate and each the stop gate. Since a pulse to be given to the read gate is supplied by the vertical shift register 23 shown in FIG. 3, pulses to be supplied therefrom to the photodiodes $20m$ and $20m+1$ include a read timing pulse 40 and an exhaustion timing pulse 41, respectively. In case of the photodiode $20m$ not to be subjected to the electron shutter operation, a pulse including only a read pulse 42 is given to the corresponding stop gate at the same timing as the read timing pulse 40. At the time, a charge obtained by photoelectric conversion for an interval $t_0$ defined by the length between the two read pulses 42 is read as a signal charge. While, to the stop gate of the photodiode $20m+1$ is given a pulse including the read pulse 42 and an exhaustion pulse 43 respectively at the same timing as the read timing pulse 40 and the exhaustion timing pulse 41 in the pulse to be given to the corresponding read gate.

In this case, since a charge obtained by photoelectric conversion for an interval $t_2$ defined by the length between the read pulse 42 and the exhaustion pulse 43 is exhausted, a signal charge is not given. Accordingly, the exposure time for the photodiode $20m+1$ is reduced to $t_1/t_0$ as compared to that for the photodiode $20m$, thus the sensitivity of the former diode $20m+1$ is substantially suppressed.

When the output of the preceding signal storage diodes, for example, diodes 2002 and 2011, as shown in FIG. 3, are saturated, the positions of the diodes 2002 and 2011 can be detected by the position detection portion 142. The signals LOW, HIGH, ... LOW corresponding to the signal storage diodes 2001, 2002, ... $200n$ and signals HIGH, LOW, ... LOW corresponding to the signal storage diode 2011, 2012, ... $201n$ are made by the position detection portion 142 as shown in FIG. 2. These signals 143 are transferred into the sensitivity suppression pulse generation portion 132.

When an exhaustion timing pulse 41 is generated on the address line $23n-1$, these signals LOW, HIGH, ... LOW are transferred from the sensitivity suppression pulse generation portion 132 into the stop signal register 29, so that the signals LOW, HIGH, ... LOW are generated on the stop gate lines 2891, 292, ... 29n. Then, only the saturated signal charge of the signal storage diode 2002 is exhausted into the potential well, as shown in FIG. 5C.

Next, when the read timing pulse 40 is generated, the signals HIGH, HIGH, ... HIGH are transferred from the sensitivity suppression pulse generation portion 132 to the solid state area sensor 12, just as signals HIGH, HIGH, ... HIGH are generated on the stop gate lines 291, 292, 29 ... 29n. Then, the unsuppressed signals in the signal storage diodes 2001 and $200n$ and the suppressed signal and the signal storage diode 2002 are transferred into the signal potential well 35.

Similarly, when the exhaustion timing pulse 41, as shown in FIG. 6, is generated on the address line $23n$, the signals HIGH, LOW, ... LOW are generated on the stop gate lines 291, 292, ... 29n. When the read timing pulse 40 is generated on the address lines $23n$, the signals HIGH, HIGH, ... HIGH are generated on the stop gate lines 291, 292, 29n. Thus, only the signal charges of the signal storage diode 2011 are suppressed. The suppressed signal charges of the signal storage diode 2011 are then read out into the signal potential well 35.

Thus, the picture as a signal charge, adjusted by using the signals of the preceding line, as described above, can be obtained.

Figure 7:
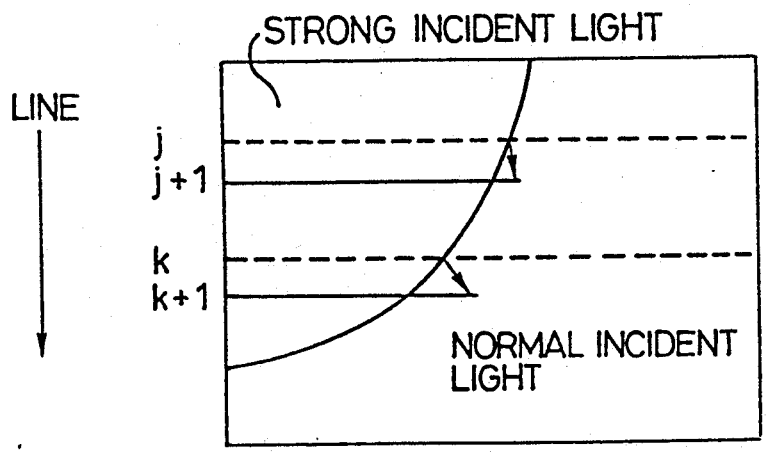
FIG. 7 is a diagram to explain an operational range of sensitivity suppression in the line address type CCD sensor shown in FIG. 4.

With respect to the position detection for the sensitivity suppression, it is possible to set a suppression area based on an output of the previous frame or field in the solid-state area sensor 12, which is stored in a memory at a time as described above, or to set a suppression area based on an output signal value for the previous line. Namely, as shown in FIG. 7, when a light object to be photographed is located at the right upper portion in a playback picture plane, a position in a line $j+1$, where the sensitivity is to be suppressed, is set at the same position as a position receiving a strong incident light in a line j previously shifted by one line from the line j+1. Otherwise, as shown by using lines k and k+1, it is possible to set an area to be subjected to the sensitivity suppression in the line k+1 at an area a little wider than an area receiving a strong light in the line k.

Various modification will become possible for those skilled in the art after receiving the teachings of the present disclosure without departing from the scope thereof.

What is claimed is:

1. A solid-state camera comprising:
   a solid-state image sensor element composed of a plurality of units of picture element cells planarly arranged therein for outputting electric signals obtained by the photoelectric conversion of incident light;
   drive means for driving the solid-state image sensor element; and
   signal process means for processing the signals outputted from the solid-state image sensor element to obtain picture image signals;
   wherein the signal process means has means for detecting a position which receives strong light over a predetermined strength introduced onto the solid-state image sensor element and generates a detection signal,
   the drive means having sensitivity adjustment means for outputting sensitivity adjustment signals to adjust the sensitivity of each of the units of picture element cells existing in a specific portion in the solid-state image sensor element based on the detection signal, and the sensitivity of each picture element cell can be independently controlled variably by the sensitivity adjustment means.

2. A solid-state camera according to claim 1, wherein the solid-state image sensor element is composed of a line address type CCD sensor comprising a plurality of vertical CCDs and a horizontal CCD and
   the sensitivity adjustment means having an electron shutter function.

3. A solid-state camera according to claim 2, wherein the electron shutter function of the sensitivity adjustment means includes read gates corresponding to the respective picture element cells, stop gates respectively connected to the read gates in series, and exhaustion drains respectively connected to the stop gates in series, and provided at end portions of the vertical CCD so as to exhaust output signals.

4. A solid-state camera according to claim 3, wherein each stop gate is opened at the same time as a read pulse for reading and an exhaustion pulse for exhausting the output signal to each exhaustion drain, both of which are supplied to each read gate, at the position which receives strong light over a predetermined strength.

5. A solid-state camera according to claim 3, wherein each the read gate is composed of a MOS transistor.

6. A signal processing method of a solid-state camera comprising:
   outputting electric signals generated by the photoelectric conversion of incident light received by a solid-state image sensor element composed of a plurality of planarly arranged picture element cells;
   processing output signals from a unit of picture element cells of a previous field by an output signal process means, and detecting a position of a unit of picture element cells in the solid-state image sensor element corresponding to the output signal when the output signal is over a predetermined value, then generating a detection signal;
   outputting a sensitivity adjustment signal to the unit of picture element cells based on the detection signal; and
   controlling the output signal of the unit of picture element cells based on the sensitivity adjustment signals.

* * * * *